US012567631B2

(12) United States Patent
Wu et al.

(10) Patent No.: US 12,567,631 B2
(45) Date of Patent: Mar. 3, 2026

(54) BATTERY, BATTERY MODULE, AND BATTERY PACK

(71) Applicants:EVE POWER CO., LTD., Hubei (CN); HUIZHOU EVE POWER CO., LTD, Guangdong (CN)

(72) Inventors: Di Wu, Hubei (CN); Kaibo Li, Hubei (CN); Feng Chen, Hubei (CN); Wei He, Hubei (CN); Jincheng Liu, Hubei (CN)

(73) Assignees: EVE POWER CO., LTD., Jingmen (CN); HUIZHOU EVE POWER CO., LTD., Huizhou (CN)

( * ) Notice: Subject to any disclaimer, the term of this patent is extended or adjusted under 35 U.S.C. 154(b) by 592 days.

(21) Appl. No.: 18/003,446

(22) PCT Filed: Oct. 26, 2022

(86) PCT No.: PCT/CN2022/127587
§ 371 (c)(1),
(2) Date: Dec. 27, 2022

(87) PCT Pub. No.: WO2023/173753
PCT Pub. Date: Sep. 21, 2023

(65) Prior Publication Data
US 2024/0106042 A1 Mar. 28, 2024

(30) Foreign Application Priority Data
Jun. 2, 2022 (CN) .......................... 202221374414.7

(51) Int. Cl.
*H01M 50/184* (2021.01)
*H01M 50/107* (2021.01)
(Continued)

(52) U.S. Cl.
CPC ....... *H01M 50/184* (2021.01); *H01M 50/107* (2021.01); *H01M 50/188* (2021.01); *H01M 50/559* (2021.01)

(58) Field of Classification Search
CPC ............. H01M 50/184; H01M 50/107; H01M 50/559; H01M 50/188
(Continued)

(56) References Cited

U.S. PATENT DOCUMENTS

2017/0012251 A1 1/2017 Shiraishi
2021/0210813 A1* 7/2021 Sun ...................... H01M 50/159

FOREIGN PATENT DOCUMENTS

CN 108365138 A 8/2018
CN 212366065 U 1/2021
(Continued)

OTHER PUBLICATIONS

European Office Action issued in corresponding European Patent Application No. 22822832.6 dated Oct. 14, 2024, pp. 1-11.
(Continued)

*Primary Examiner* — James M Erwin
(74) *Attorney, Agent, or Firm* — PV IP PC; Wei Te Chung

(57) ABSTRACT

The present application relates to the field of battery technologies, for example, to a battery, a battery module, and a battery pack. The battery includes a housing, a terminal pole column, and an upper plastic member. A first through hole is defined on a top cover of the housing. The terminal pole column passes through the first through hole. The upper plastic member is disposed above the top cover of the housing. The terminal pole column is capable of passing through the upper plastic member and bending outward to form a flange, and the terminal pole column abuts against the upper plastic member, and an upper top surface of the
(Continued)

terminal pole column and an upper top surface of the upper plastic member are flush with each other.

12 Claims, 5 Drawing Sheets

(51) Int. Cl.
　　*H01M 50/188* (2021.01)
　　*H01M 50/559* (2021.01)
(58) Field of Classification Search
　　USPC ......................................................... 429/185
　　See application file for complete search history.

(56) References Cited

FOREIGN PATENT DOCUMENTS

| CN | 214336801 | U | 10/2021 |
| CN | 215342691 | U | 12/2021 |
| CN | 114156579 | A | 3/2022 |
| CN | 114361667 | A | 4/2022 |
| CN | 114899556 | A | 8/2022 |
| CN | 217589342 | U | 10/2022 |
| JP | 2019084540 | A | 6/2019 |
| KR | 20130087420 | A | 8/2013 |

OTHER PUBLICATIONS

Nasrollaht V , et al: "Prediction of springback in sheet metal components with holes on the bending area, using experiments, finite element and neural networks", Materials and Design, [Online] vol. 36, Nov. 25, 2011 (Nov. 25, 2011) pp. 331-336, XP093208112, GB ISSN: 0261-3069, DOI: 10.1016/j.matdes.2011.11.039.

International Search Report in International application No. PCT/CN2022/127587, mailed on Feb. 17, 2023.

Written Opinion of the International Search Authority in International application No. PCT/CN2022/127587, mailed on Feb. 17, 2023.

* cited by examiner

BATTERY, BATTERY MODULE, AND BATTERY PACK

CROSS-REFERENCE TO RELATED APPLICATION

This application is a National Stage Appl. filed under 35 USC 371 of International Patent Application No. PCT/CN2022/127587 with an international filing date of Oct. 26, 2022, designating the United States, now pending, and further claims priority to Chinese Patent Application Serial No. 202221374414.7. The aforementioned application is herein incorporated by reference in its entirety.

TECHNICAL FIELD

The present application relates to the field of battery technologies, for example, to a battery, a battery module, and a battery pack.

BACKGROUND

For battery users, large cylindrical batteries are capable of saving a number of elements, and further improving production efficiency and assembly efficiency of the batteries. A terminal pole column and an upper plastic member need to be stably sealed and installed with a top cover of a housing in production processes of a cylindrical battery, so as to ensure a safety performance of the battery. The larger a distance in a vertical direction between the terminal pole column and the top cover of the housing, the larger an insulating medium between the terminal pole column and the top cover of the housing, which can further improve the safety performance of the battery. Therefore, in a cylindrical battery, the insulating medium is generally much higher than a height of the upper plastic member to increase the insulating medium in the vertical direction between the terminal pole column and the top cover of the housing, which greatly reduces a neatness and an aesthetic extent of the cylindrical battery.

Therefore, there is an urgent need to provide a battery, a battery module, and a battery pack to solve technical problems mentioned above.

SUMMARY

The present application provides a battery, to make a top of the battery more neat and aesthetic, and to improve a safety of the battery.

The present application provides a battery module, to make a top of the battery module more neat and aesthetic, and to improve a safety of the battery module.

The present application provides a battery pack, to make a top of the battery pack more neat and aesthetic, and to improve a safety of the battery pack.

In a first aspect, a battery is provided in an embodiment of the present application, including:

a housing, where a first through hole is defined on a top cover of the housing;

a terminal pole column passing through the first through hole; and an upper plastic member disposed above the top cover of the housing, where the terminal pole column is capable of passing through the upper plastic member and bending outward to form a flange, so that the terminal pole column abuts against the upper plastic member, and an upper top surface of the terminal pole column and an upper top surface of the upper plastic member are flush with each other.

In an embodiment, an accommodating groove is defined on the upper top surface of the upper plastic member, and a second through hole is defined on a bottom wall of the accommodating groove, the terminal pole column is capable of passing through the second through hole to bend outward and abut against the bottom wall of the accommodating groove, so that the upper top surface of the terminal pole column and the upper top surface of the upper plastic member are flush with each other In an embodiment, the terminal pole column includes:

a pole column portion;

a pole plate portion connected to the pole column portion and located below the top cover of the housing; and a sealing flange connected to the pole plate portion and disposed opposite to the pole plate portion, where the sealing flange is disposed surrounding an outer periphery of the pole column portion, and the sealing flange bends outward relative to the pole column portion and the pole plate portion and abuts against the bottom wall of the accommodating groove.

In an embodiment, a plurality of flange gaps are defined on an outer peripheral wall of the sealing flange at intervals.

In an embodiment, an annular avoidance groove is defined between the sealing flange and the pole column portion, so that the sealing flange and the pole column portion are spaced from each other.

In an embodiment, an upper top surface of the sealing flange, an upper top surface of the pole column portion, and the upper top surface of the upper plastic member are flush with each other.

In an embodiment, an annular reinforced rib is disposed at a position at which the sealing flange bends outward relative to the pole column portion and the pole plate portion.

In an embodiment, a positioning protrusion is disposed on one of a lower end surface of the upper plastic member and the top cover of the housing, a positioning groove is defined on the other one of the lower end surface of the upper plastic member and the top cover of the housing, and the positioning protrusion is capable of being inserted into the positioning groove.

In an embodiment, an annular protrusion is provided on a lower end surface of the upper plastic member, and the annular protrusion is sandwiched between the terminal pole column and an inner peripheral wall of the first through hole.

In an embodiment, the battery further includes:

a sealing ring sleeved on the terminal pole column and sandwiched among the terminal pole column, an inner peripheral wall of the first through hole, and an inner wall of the top cover of the housing;

a lower plastic member attached to the inner wall of the top cover of the housing and sleeved on an outer periphery of the sealing ring;

an electrical connecting member attached to the lower plastic member and connected to the terminal pole column; and a battery cell disposed inside the housing and connected to the electrical connecting member.

In a second aspect, a battery module is provided in an embodiment of the present application, including the battery mentioned above.

In a third aspect, a battery pack is provided in an embodiment of the present application, including at least one group of the battery module mentioned above.

Beneficial effects of the present application are that:

According to the battery provided by the present application, the terminal pole column passes through the first through hole defined on the top cover of the housing, the upper plastic member is disposed above the top cover of the housing, and the terminal pole column passes through the upper plastic member and bends outward to form the flange, and the terminal pole column abuts against the upper plastic member, so that the upper plastic member and the top cover of the housing can be stably coated, thereby realizing a sealing effect, and ensuring stability and reliability of connections among the terminal pole column, the upper plastic member, and the top cover of the housing. In addition, the upper top surface of the terminal pole column and the upper top surface of the upper plastic member are flush with each other, so that not only the top of the battery is more neat and aesthetic, but also the insulating medium in the vertical direction between the terminal pole column and the top cover of the housing is increased, thereby improving the safety of the battery.

The battery module provided by the present application adopts the battery mentioned above to improve a connection stability and the sealing effect among the housing, the terminal pole column, and the upper plastic member, so that an overall structure of the battery module is more neat and aesthetic, and the safety of the battery module is also improved.

The battery pack provided by the present application adopts at least one group of the battery module mentioned above, so that an overall structure of the battery pack is more neat and aesthetic, and the safety of the battery pack is also improved.

Figure 1:
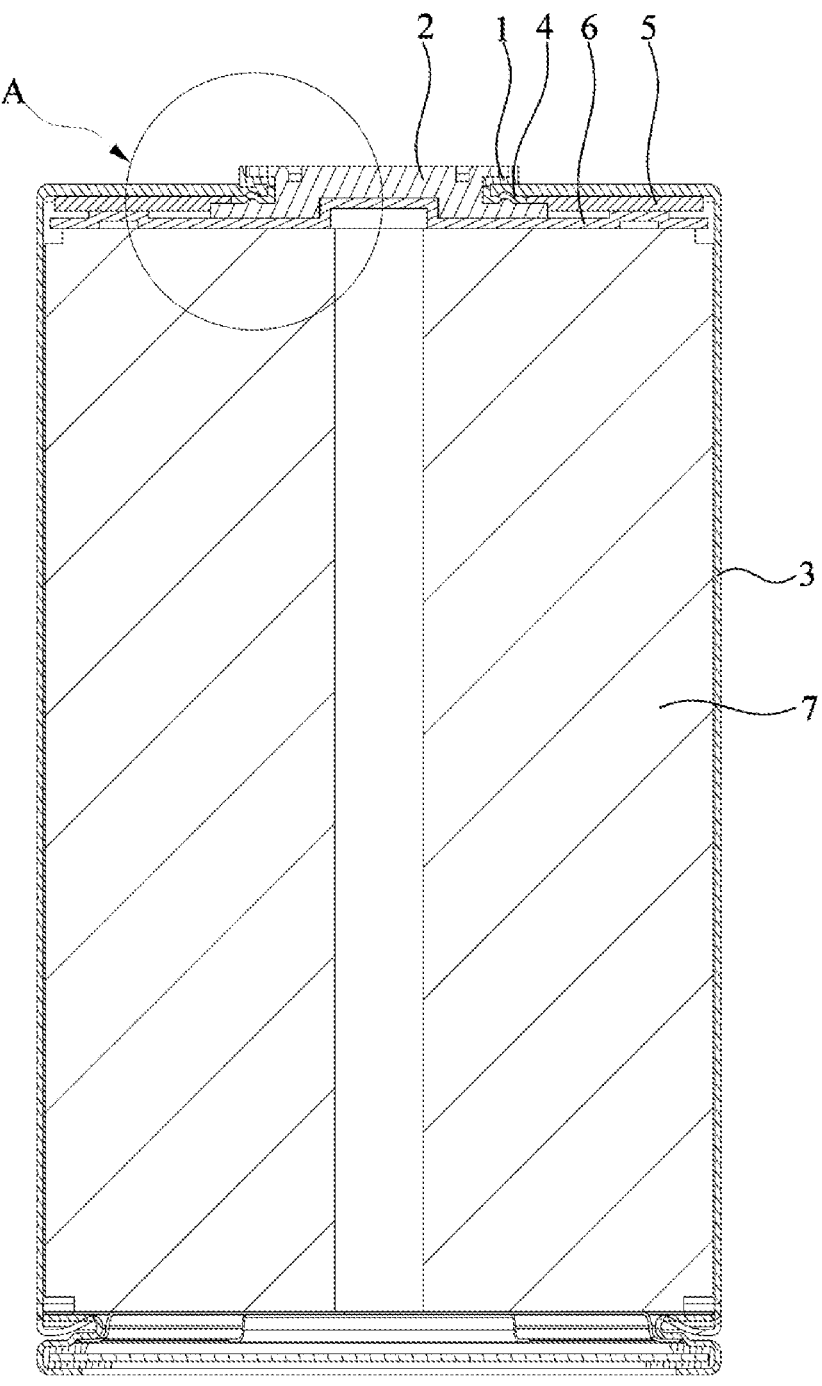
FIG. 1 is a first sectional view of a battery provided by an embodiment of the present application.

REFERENCE NUMERALS 1, upper plastic member; 11, accommodating groove; 111, second through hole; 12, positioning protrusion; 13, annular protrusion; 2, terminal pole column; 21, pole column portion; 22, sealing flange; 221, flange gap; 222, annular reinforcing rib; 23, pole plate portion; 231, first positioning bump; 24, annular avoidance groove; 3, housing; 31, first through hole; 32, positioning groove; 33, second positioning groove; 4, sealing ring; 41, first positioning groove; 42, second positioning bump; 5, lower plastic member; 6, electrical connecting member; 7, battery cell.

DETAILED DESCRIPTION OF THE EMBODIMENT

In the description of the present application, unless otherwise specified and limited, the terms "link", "connect" or "fix" are to be construed in a broad sense, for example, as fixedly connected, detachably connected, or integrated; mechanically connected or electrically connected; directly connected to each other or indirectly connected to each other via an intermediary; or internally connected between two elements or interacted between two elements. Meanings of the preceding terms in the present application may be understood according to situations by an ordinary person in the art.

In the present application, unless otherwise specified and limited, when a first feature is described as "on" or "below" a second feature, the first feature and the second feature may be in direct contact, or be in contact via another feature between the two features instead of being in direct contact. Moreover, when the first feature is described as "on", "above" or "over" the second feature, the first feature is right on, above or over the second feature or the first feature is obliquely on, above or over the second feature, or the first feature is simply at a higher level than the second feature. When the first feature is described as "under", "below" or "underneath" the second feature, the first feature is right under, below or underneath the second feature, or the first feature is obliquely under, below or underneath the second feature, or the first feature is simply at a lower level than the second feature.

In description of the embodiment, it should be understood that orientational or positional relationships represented by directional terms mentioned in the present application, such as up, down, left, right, etc., are orientational or positional relationships based on the drawings, and are merely for the convenience of describing the present application and simplifying the description, rather than indicating or implying that the device or element is intended to have a particular orientation, or is constructed and operated in a particular orientation, and therefore, should not be interpreted as a limitation of the present application. In addition, the terms "first" and "second" are only used to distinguish between the descriptions, and have no special meaning.

A terminal pole column and an upper plastic member need to be stably sealed and installed with a top cover of a housing in production processes of a cylindrical battery, so as to ensure a safety performance of the battery. The larger a distance in a vertical direction between the terminal pole column and the top cover of the housing, the larger an insulating medium between the terminal pole column and the top cover of the housing, which can further improve the safety performance of the battery. Therefore, in a cylindrical battery, the insulating medium is generally much higher than a height of the upper plastic member to increase the insulating medium in the vertical direction between the terminal pole column and the top cover of the housing, which greatly reduces a neatness and an aesthetic extent of the cylindrical battery.

In order to solve technical problems mentioned above, as shown in FIG. 1 and FIG. 2, a battery is provided in the embodiment, The battery may be the cylindrical battery, which includes an upper plastic member 1, a terminal pole column 2, and a housing 3. A first through hole 31 is defined on a top cover of the housing 3. The terminal pole column 2 passes through the first through hole 31. The upper plastic member 1 is disposed above the top cover of the housing 3. The terminal pole column 2 is capable of passing through the upper plastic member 1 and bending outward to form a flange, and the terminal pole column 2 abuts against the upper plastic member 1, and an upper top surface of the terminal pole column 2 and an upper top surface of the upper plastic member 1 are flush with each other. The terminal pole column 2 passes through the upper plastic member land bends outward to form the flange, and the terminal pole column 2 abuts against the upper plastic member 1, so as to realize a sealing effect and ensure stability and reliability of connections between the terminal pole column 2, the upper plastic member 1, and the top cover of the housing 3. In addition, the upper top surface of the terminal pole column 2 and the upper top surface of the upper plastic member 1 are flush with each other, so that not only a top of the battery is more neat and aesthetic, but also the insulating medium in the vertical direction between the terminal pole column 2 and the top cover of the housing 3 are increased, thereby improving the safety of the battery.

Figure 2:
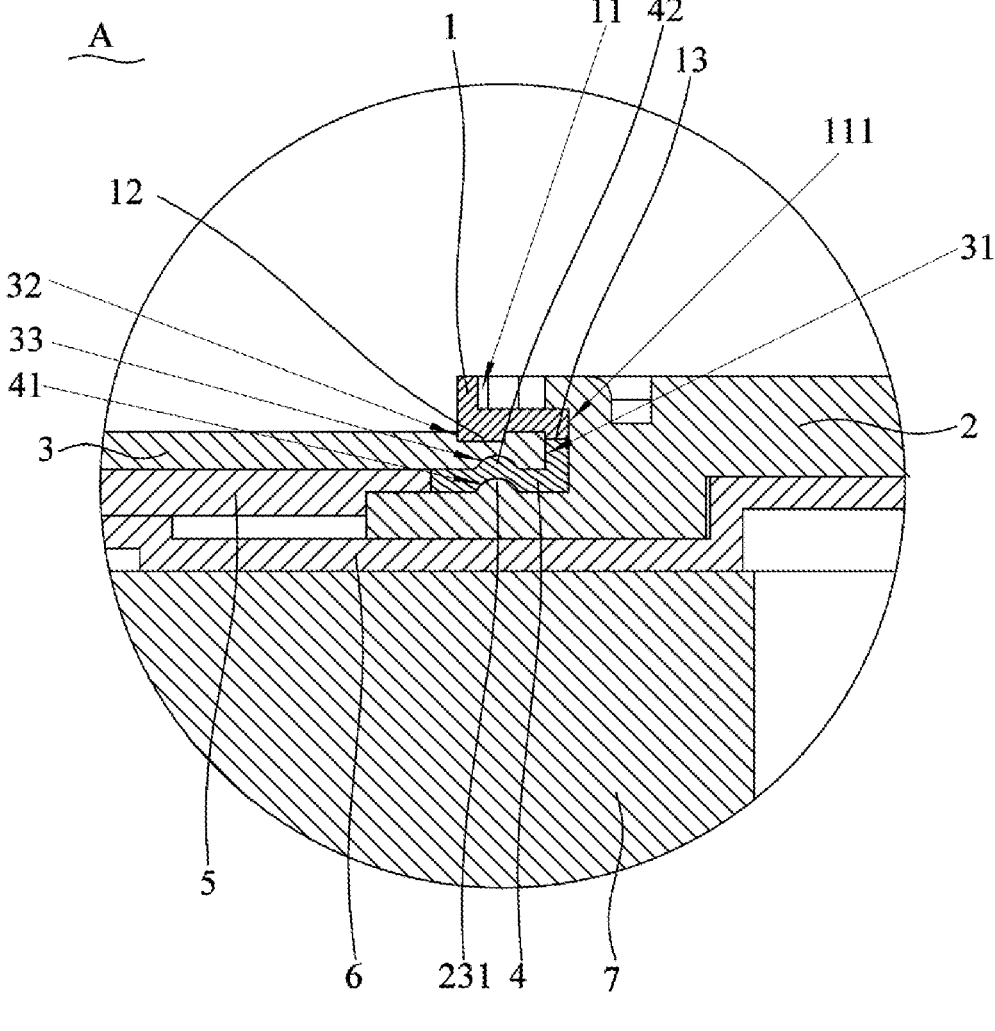
FIG. 2 is a partial enlarged view of portion A in FIG. 1.

It should be noted that, in the embodiment, as shown in FIG. 2, the terminal pole column 2 completely passes through the first through hole 31, so that an overlapping height of the terminal pole column 2 and the first through hole 31 is maximized, and a height of the top cover of the housing 3 is further reduced, which is beneficial to improving a volume energy density of the battery.

For example, as shown in FIG. 2, an accommodating groove 11 is defined on the upper top surface of the upper plastic member 1, a second through hole 111 is defined on a bottom wall of the accommodating groove 11, and the terminal pole column 2 is capable of passing through the second through hole 111 to bend outward and abutting against the bottom wall of the accommodating groove 111, so that the upper top surface of the terminal pole column 2 and the upper top surface of the upper plastic member 1 are flush with each other.

Figure 3:
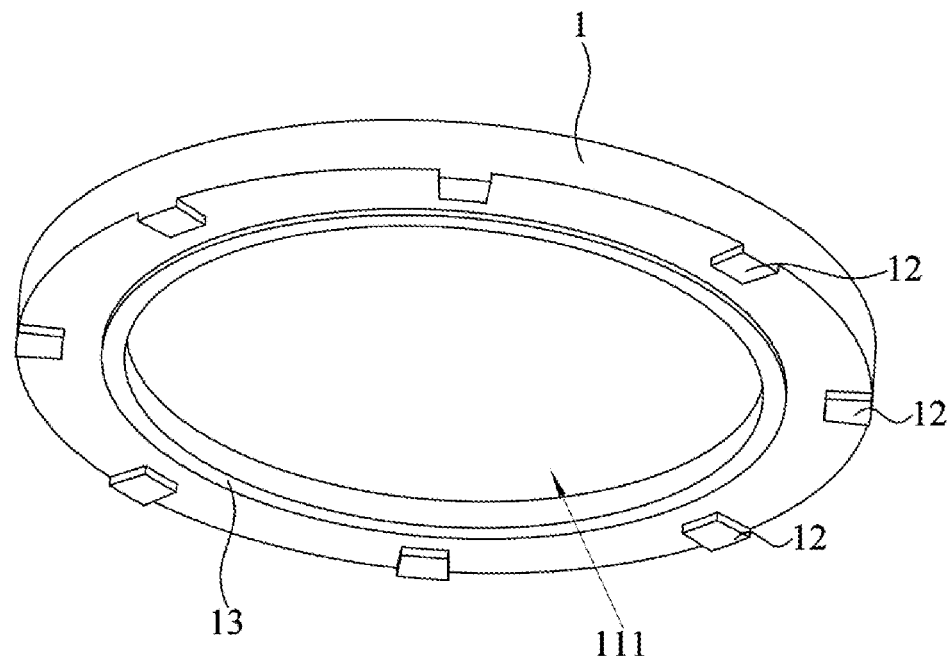
FIG. 3 is a schematic structural view of an upper plastic member provided by an embodiment of the present application.

In order to ensure that the upper plastic member 1 is placed on the top cover of the housing 3 more accurately and stably, as shown in FIG. 2 and FIG. 3, a positioning protrusion 12 is disposed on a lower end surface of the upper plastic member 1, a positioning groove 32 is defined on the top cover of the housing 3, and the positioning protrusion 12 is capable of being inserted into the positioning groove 32, so as to ensure that the upper plastic member 1 is positioned on the top cover of the housing 3 more accurately, and the upper plastic member 1 is connected with the top cover of the housing 3 more reliably and stably. It should be noted that, in other embodiments, the positioning groove 32 may also be defined on the lower end surface of the upper plastic member 1, and the positioning protrusion 12 may also be disposed on the top cover of the housing 3.

For example, as shown in FIG. 3, a plurality of positioning protrusions 12 are disposed on the upper plastic member 1 at intervals in a circumferential direction, and each of the plurality of positioning protrusions 12 corresponds to one positioning groove 32, thereby further improving reliability and stability of a connection between the upper plastic member 1 and the top cover of the housing 3.

In the embodiment, as shown in FIG. 2 and FIG. 3, an annular protrusion 13 is provided on a lower end surface of the upper plastic member 1, the annular protrusion 13 is provided surrounding the second through hole 111, and the annular protrusion 13 is sandwiched between the terminal pole column 2 and an inner peripheral wall of the first through hole 31, thereby further improving reliability and stability of a connection among the upper plastic member 1, the terminal pole column 2, and the top cover of the housing 3.

In order to further improve a sealing performance of a connection between the terminal pole column 2 and the first through hole 31, as shown in FIG. 2, the battery further includes a sealing ring 4. The sealing ring 4 is sleeved on the terminal pole column 2, and the sealing ring 4 is sandwiched among the terminal pole column 2, an inner peripheral wall of the first through hole 31, and an inner wall of the top cover of the housing 3, so that the sealing ring 4 not only ensures a connection sealing performance between the terminal pole column 2 and the first through hole 31, but also ensures an insulation characteristic between the terminal pole column 2 and the inner wall of the top cover of the housing 3 and between the terminal pole column 2 and the inner circumferential wall of the first through hole 31.

In the embodiment, the annular protrusion 13 is connected to the sealing ring 4 between the terminal pole column 2 and the inner peripheral wall of the first through hole 31, so that the upper plastic member 1 and the sealing ring 4 completely separate the terminal pole column 2 from the housing 3, thereby ensuring the insulation characteristic between the terminal pole column 2 and the housing 3.

For example, as shown in FIG. 2, a first positioning groove 41 is defined on a lower end surface of the sealing ring 4, the first positioning bump 231 is disposed on the terminal pole column 2, and the first positioning bump 231 is capable of being inserted into the first positioning groove 41, so as to ensure that the sealing ring 4 can be sleeved on the terminal pole column 2 more quickly and accurately to realize positioning and installation. In addition, a second positioning bump 42 is disposed on an upper end surface of the sealing ring 4, a second positioning groove 33 is defined on the top cover of the housing 3, and the second positioning bump 42 is capable of being inserted into the second positioning groove 33, so that a precise installation between the sealing ring 4 and the top cover of the housing 3 is realized, an installation and connection stability among the sealing ring 4, the terminal pole column 2, and the top cover of the housing 3 is more accurate, and a connection stability among the sealing ring 4, the terminal pole column 2, and the top cover of the housing 3 is further improved. In other embodiments, the first positioning groove 41 may also be defined on the terminal pole column 2, the first positioning bump 231 is disposed on the lower end surface of the sealing ring 4, the second positioning groove 33 is defined on the upper end surface of the sealing ring 4, and the second positioning bump 42 is disposed on the top cover of the housing 3. It should be noted that, the first positioning bump 231 and the second positioning bump 42 are annular, and correspondingly, the first positioning groove 41 and the second positioning bump 42 are annular.

In the embodiment, the sealing ring 4 is recessed towards the inner wall of the top cover of the housing 3 to define the first positioning groove 41, the second positioning bump 42 is formed at a side of the sealing ring 4 towards the inner wall of the top cover of the housing 3, and the terminal pole column 2 is protruded towards a side of the sealing ring 4 to form the first positioning bump 231. This arrangement not only facilitates a processing of the sealing ring 4, but also makes a structure of the sealing ring 4 more compact.

In addition, as shown in FIG. 2, the battery further includes a lower plastic member 5, an electrical connecting member 6, and a battery cell 7. The lower plastic member 5 is attached to the inner wall of the top cover of the housing 3, and the lower plastic member 5 is sleeved on an outer periphery of the sealing ring 4, so as to further ensure the insulation characteristic between the terminal pole column 2 and the inner wall of the top cover of the housing 3. The electrical connecting member 6 is attached to the lower plastic member 5, and the electrical connecting member 6 is connected to the terminal pole column 2. The battery cell 7 is disposed inside the housing 3, and the battery cell 7 is connected to the electrical connecting member 6.

Figure 4:
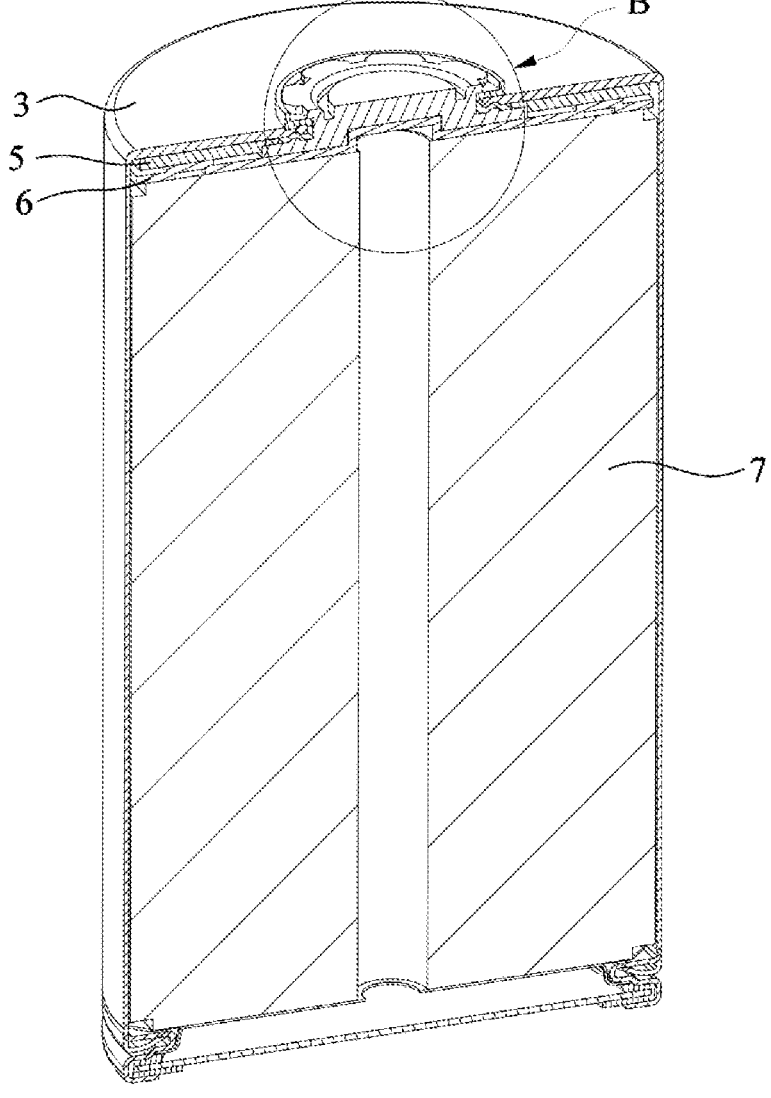
FIG. 4 is a second sectional view of the battery provided by an embodiment of the present application.
Figure 5:
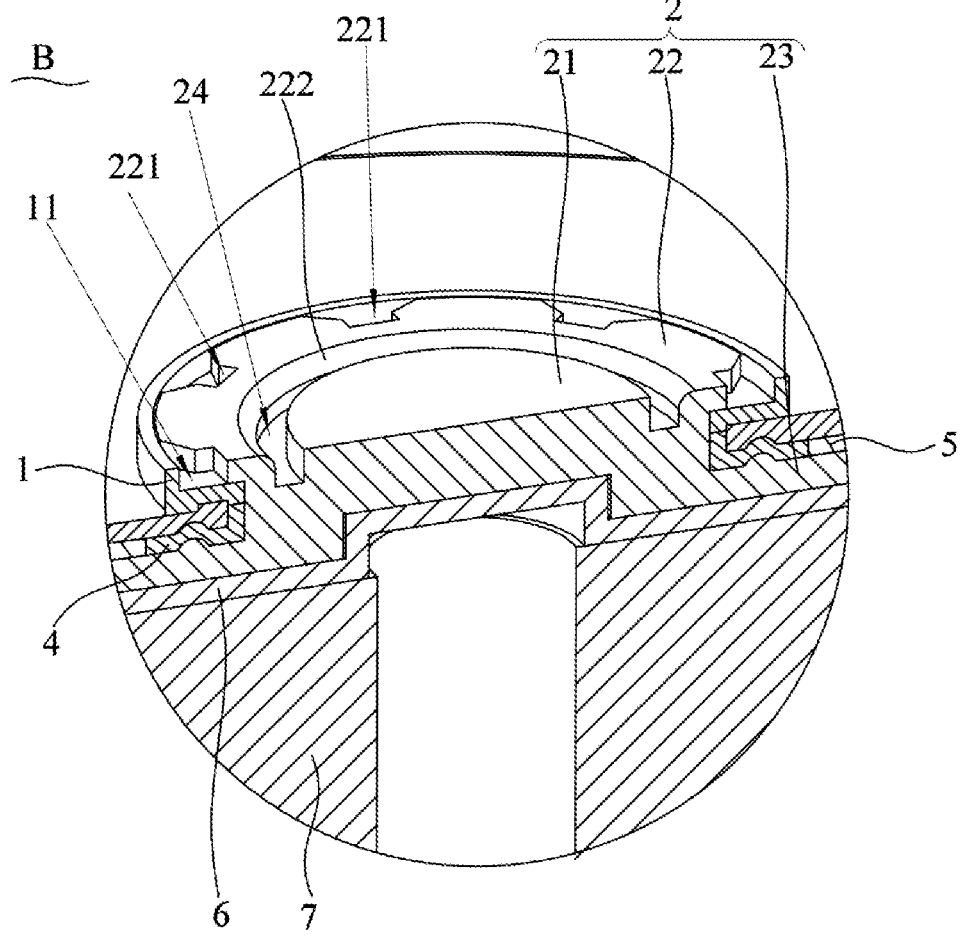
FIG. 5 is a partial enlarged view of portion B in FIG. 4.

A specific structure of the terminal pole column 2 is described in combination with FIG. 4 and FIG. 5. As shown in FIG. 4 and FIG. 5, the terminal pole column 2 includes a pole column portion 21, a pole plate portion 23, and a sealing flange 22. The pole plate portion 23 is connected to the pole column portion 21 and located below the sealing ring 4 and the lower plastic member 5. The sealing flange 22 is connected to the pole plate portion 23 and disposed opposite to the pole plate portion 23, the sealing flange 22 is disposed surrounding an outer periphery of the pole column portion 21, and the sealing flange 22 bends outward relative to the pole column portion 21 and the pole plate portion 23 and abuts against the bottom wall of the accommodating groove 11. It should be noted that, in the embodiment, the pole column portion 21, the pole plate portion 23, and the sealing flange 22 are integrally formed, thereby simplifying the production process of the terminal pole column 2, and reducing production cost of the terminal pole column 2. In the embodiment, the pole plate portion 23 is protruded at a side of towards the sealing ring 4 to form the first positioning bump 231.

In the embodiment, the sealing flange 22, the pole column portion 21, and the upper top surface of the upper plastic member 1 are flush with each other, so that the top of the battery is more neat and aesthetic.

For example, as shown in FIG. 5, a plurality of flange gaps 221 are disposed on an outer peripheral wall of the sealing flange 22 at intervals. When the sealing flange 22 bends outward to form the flange relative to the pole column portion 21 and the pole plate portion 23, a stretching deformation force of the outer peripheral wall of the sealing flange 22 during a bending process is reduced by the flange gaps 221, so as to prevent cracks in the outer peripheral wall of the sealing flange 22 due to an excessive stretching force during the bending process, thereby ensuring reliability of the sealing flange 22 during the bending process.

For example, as shown in FIG. 5, an annular avoidance groove 24 is defined between the sealing flange 22 and the pole column portion 21, so that the sealing flange 22 and the pole column portion 21 are spaced from each other, which is more beneficial to bending outward the sealing flange 22 to form the flange relative to the pole column portion 21 and pole plate portion 23.

In the embodiment, as shown in FIG. 5, an annular reinforcing rib 222 is disposed at a position where the sealing flange 4 bends outwards relative to the pole column portion 21 and pole plate portion 23, so that a structural strength of a bending position of the sealing flange 22 is improved to prevent the bending position from cracking during the bending process of the sealing flange 22, thereby improving a structural strength of the whole terminal pole column 2.

The present embodiment further provides a battery module. By adopting the battery mentioned above in the battery module, a connection stability and the sealing effect among the housing, the terminal pole column, and the upper plastic member are improved, so that an overall structure of the battery module is more neat and aesthetic, and the safety performance of the battery module is also improved.

The present embodiment further provides a battery pack, including at least one group of the battery module mentioned above, so that an overall structure of the battery pack is more neat and aesthetic, and the safety performance of the battery pack is also improved.

What is claimed is:

1. A battery, comprising:
a housing, wherein a first through hole is defined on a top cover of the housing;
a terminal pole column passing through the first through hole; and an upper plastic member disposed above the top cover of the housing, wherein the terminal pole column is capable of passing through the upper plastic member and bending outward to form a flange, so that the terminal pole column abuts against the upper plastic member, and an upper top surface of the terminal pole column and an upper top surface of the upper plastic member are flush with each other;

wherein an accommodating groove is defined on the upper top surface of the upper plastic member, and a second through hole is defined on a bottom wall of the accommodating groove, the terminal pole column is capable of passing through the second through hole and bending outward to form the flange, and the terminal pole column abuts against the bottom wall of the accommodating groove, so that the upper top surface of the terminal pole column and the upper top surface of the upper plastic member are flush with each other;

wherein the terminal pole column comprises: a pole column portion; a pole plate portion connected to the pole column portion and located below the top cover of the housing; and a sealing flange connected to the pole plate portion and disposed opposite to the pole plate portion, wherein the sealing flange is disposed surrounding an outer periphery of the pole column portion, and the sealing flange bends outward relative to the pole column portion and the pole plate portion and abuts against the bottom wall of the accommodating groove; and wherein a plurality of flange gaps are defined on an outer peripheral wall of the sealing flange at intervals.

2. The battery of claim 1, wherein an annular avoidance groove is defined between the sealing flange and the pole column portion, so that the sealing flange and the pole column portion are spaced from each other.

3. The battery of claim 1, wherein an upper top surface of the sealing flange, an upper top surface of the pole column portion, and the upper top surface of the upper plastic member are flush with each other.

4. The battery of claim 1, wherein an annular reinforced rib is provided at a position at which the sealing flange bends outward relative to the pole column portion and the pole plate portion.

5. The battery of claim 1, wherein a positioning protrusion is provided on one of a lower end surface of the upper plastic member and the top cover of the housing, a positioning groove is defined on the other one of the lower end surface of the upper plastic member and the top cover of the housing, and the positioning protrusion is capable of being inserted into the positioning groove.

6. The battery of claim 1, wherein an annular protrusion is provided on a lower end surface of the upper plastic member, and the annular protrusion is sandwiched between the terminal pole column and an inner peripheral wall of the first through hole.

7. The battery of claim 1, further comprising:
a sealing ring sleeved on the terminal pole column, wherein the sealing ring is sandwiched among the terminal pole column, an inner peripheral wall of the first through hole, and an inner wall of the top cover of the housing;
a lower plastic member attached to the inner wall of the top cover of the housing, wherein the lower plastic member is sleeved on an outer periphery of the sealing ring;

an electrical connecting member attached to the lower plastic member, wherein the electrical connecting member is connected to the terminal pole column; and a battery cell disposed inside the housing, wherein the battery cell is connected to the electrical connecting member.

8. A battery module, comprising a battery; wherein the battery comprises:

a housing, wherein a first through hole is defined on a top cover of the housing;

a terminal pole column passing through the first through hole; and an upper plastic member disposed above the top cover of the housing, wherein the terminal pole column is capable of passing through the upper plastic member and bending outward to form a flange, so that the terminal pole column abuts against the upper plastic member, and an upper top surface of the terminal pole column and an upper top surface of the upper plastic member are flush with each other;

wherein an accommodating groove is defined on the upper top surface of the upper plastic member, and a second through hole is defined on a bottom wall of the accommodating groove, the terminal pole column is capable of passing through the second through hole and bending outward to form the flange, and the terminal pole column abuts against the bottom wall of the accommodating groove, so that the upper top surface of the terminal pole column and the upper top surface of the upper plastic member are flush with each other;

wherein the terminal pole column comprises: a pole column portion; a pole plate portion connected to the pole column portion and located below the top cover of the housing; and a sealing flange connected to the pole plate portion and disposed opposite to the pole plate portion, wherein the sealing flange is disposed surrounding an outer periphery of the pole column portion, and the sealing flange bends outward relative to the pole column portion and the pole plate portion and abuts against the bottom wall of the accommodating groove; and wherein a plurality of flange gaps are defined on an outer peripheral wall of the sealing flange at intervals.

9. A battery pack, comprising at least one group of a battery module, wherein the battery module comprises a battery, the battery comprises:

a housing, wherein a first through hole is defined on a top cover of the housing;

a terminal pole column passing through the first through hole; and an upper plastic member disposed above the top cover of the housing, wherein the terminal pole column is capable of passing through the upper plastic member and bending outward to form a flange, so that the terminal pole column abuts against the upper plastic member, and an upper top surface of the terminal pole column and an upper top surface of the upper plastic member are flush with each other;

wherein an accommodating groove is defined on the upper top surface of the upper plastic member, and a second through hole is defined on a bottom wall of the accommodating groove, the terminal pole column is capable of passing through the second through hole and bending outward to form the flange, and the terminal pole column abuts against the bottom wall of the accommodating groove, so that the upper top surface of the terminal pole column and the upper top surface of the upper plastic member are flush with each other;

wherein the terminal pole column comprises: a pole column portion; a pole plate portion connected to the pole column portion and located below the top cover of the housing; and a sealing flange connected to the pole plate portion and disposed opposite to the pole plate portion, wherein the sealing flange is disposed surrounding an outer periphery of the pole column portion, and the sealing flange bends outward relative to the pole column portion and the pole plate portion and abuts against the bottom wall of the accommodating groove; and wherein a plurality of flange gaps are defined on an outer peripheral wall of the sealing flange at intervals.

10. The battery according to claim 1, wherein a positioning protrusion is provided on one of a lower end surface of the upper plastic member and the top cover of the housing, a positioning groove is defined on the other one of the lower end surface of the upper plastic member and the top cover of the housing, and the positioning protrusion is capable of being inserted into the positioning groove.

11. The battery of claim 1, wherein an annular protrusion is provided on a lower end surface of the upper plastic member, and the annular protrusion is sandwiched between the terminal pole column and an inner peripheral wall of the first through hole.

12. The battery of claim 1, wherein the battery further comprises:

a sealing ring sleeved on the terminal pole column, wherein the sealing ring is sandwiched among the terminal pole column, an inner peripheral wall of the first through hole, and an inner wall of the top cover of the housing;

a lower plastic member attached to the inner wall of the top cover of the housing, wherein the lower plastic member is sleeved on an outer periphery of the sealing ring;

an electrical connecting member attached to the lower plastic member, wherein the electrical connecting member is connected to the terminal pole column; and a battery cell disposed inside the housing, wherein the battery cell is connected to the electrical connecting member.

* * * * *